(No Model.)

C. R. SCHMIDT.
WATER CLOSET CONNECTION.

No. 545,733. Patented Sept. 3, 1895.

Witnesses:
J. B. McGirr.
May H. Corbett.

Inventor:
Chas. R. Schmidt
by Connolly Bros.
Attys

UNITED STATES PATENT OFFICE.

CHARLES R. SCHMIDT, OF BALTIMORE, MARYLAND.

WATER-CLOSET CONNECTION.

SPECIFICATION forming part of Letters Patent No. 545,733, dated September 3, 1895.

Application filed June 7, 1894. Serial No. 513,791. (No model.)

*To all whom it may concern:*

Be it known that I, CHARLES R. SCHMIDT, a citizen of the United States, residing at Baltimore, in the State of Maryland, have invented certain new and useful Improvements in Water-Closet Connections; and I do hereby declare the following to be a full, clear, and exact description of the invention, such as will enable others skilled in the art to which it appertains to make and use the same.

My invention has relation to water-closet connections, and has for its object the provision of novel means for connecting supply or drainage pipes to water-closets or similar articles where it is desired to have a water-tight joint between the water-pipe and the article to which it is connected and in which it is desired to avoid injury to the article by any strain upon it that may be caused by the accidental movement of the article itself or the connected pipe.

My invention consists in the provision of an elastic bushing of novel form adapted to be inserted in an opening in the body of the water-closet bowl or similar article and to closely embrace the entering end of a pipe union or section, so as to make a water-tight and elastic joint that will serve to take up any strain due to accidental displacement or movement of the bowl or pipe.

My invention further consists in the novel constructions, combinations, and arrangements of parts, hereinafter described and claimed.

Figure 1:
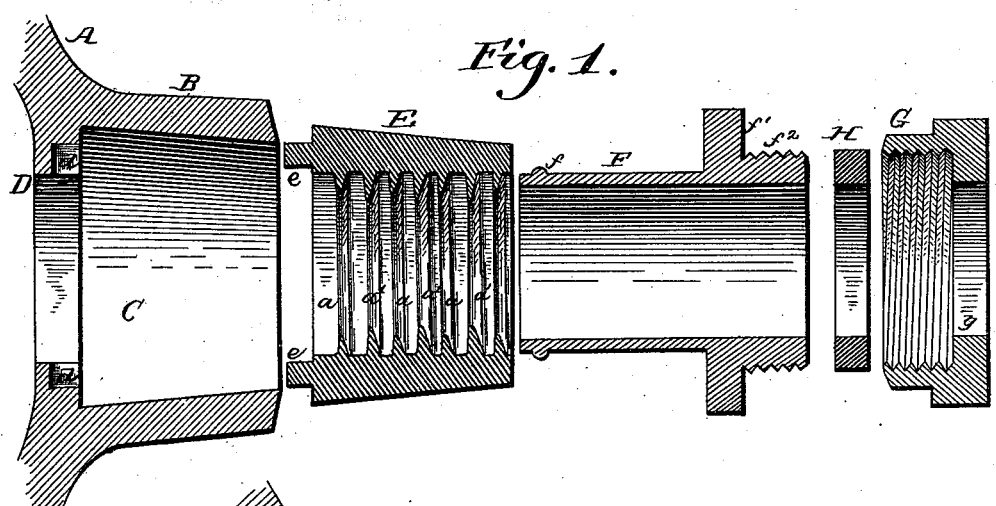
Figure 2:
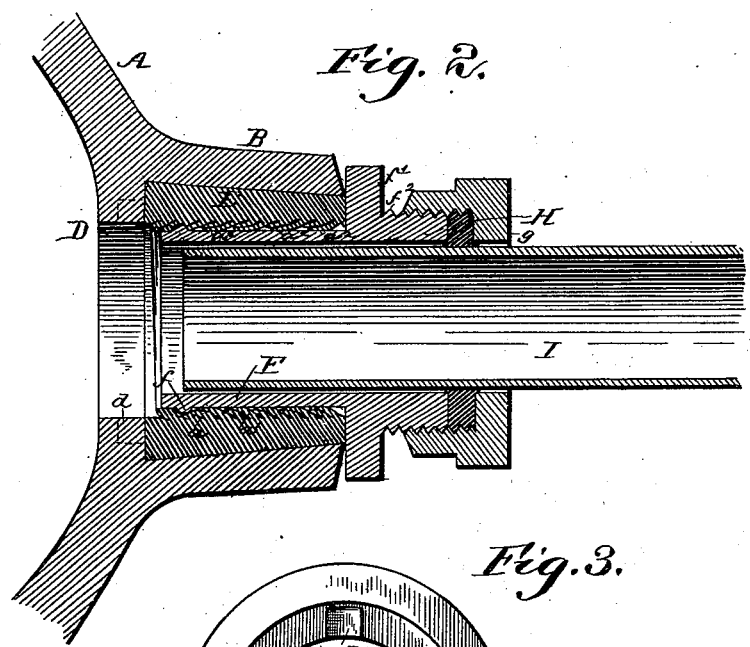
Figure 3:
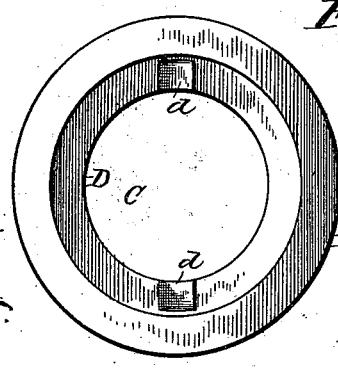

Referring to the accompanying drawings, Figure 1 is a detached sectional view of a part of the water-closet bowl and my improved connections constructed according to my invention. Fig. 2 is a sectional view of the same connected together, and Fig. 3 is an elevation of the spud end of the bowl.

A designates part of the bowl of a water-closet, and B the spud end of the same, consisting of a cylindrical boss having a slightly-tapered aperture for the reception of a bushing E and a contracted opening at its inner end formed by an annular flange D, having notches $d\ d$ on its face for the reception of lugs $e\ e$ on the bushing E. The bushing E consists of a tubular section, of rubber or similar elastic material, and is of a size to fit snugly in the opening C of the boss D and slightly tapered on the outside to correspond to the shape of the opening C. The lugs $e\ e$ are formed on the end of the bushing and enter the notches $d\ d$ of flange D, their purpose being to prevent the bushing from turning in its seat. Upon the inside of the bushing E are several parallel flanges $a\ a'$, the alternate flanges $a'$ being slightly wider than the flanges $a$, so that when pressed or folded against the bushing by the union member or pipe the flanges $a'$ will fold over or against the flanges $a$ and will form ridges within which the union member which enters the bushing will be closely embraced on the lines $a^2\ a^2$. The union member F, which enters the bushing, is formed with a bead $f$ near its inner end, which engages with one of the flanges on the inside of the bushing and serves to maintain the union member in the bushing under normal circumstances and prevent its accidental withdrawal. The outer end of the union member F is formed with the usual flange $f'$ and with the screw-thread $f^2$ for the reception of the nut G. The nut G has an inwardly-projecting flange $g$, and between this flange and the outer end of the union member an elastic washer H is placed, which, when the nut is screwed up tight, is compressed and spreads inwardly and tightly embraces the service-pipe I.

In operation the bushing E is inserted in the opening C of the spud end B, the lugs $e\ e$ entering the notches $d\ d$ and preventing the bushing from being turned around. The union member F is then pushed into the washer, causing the flanges $a\ a'$ to lap over, as shown in Fig. 2 of the drawings, and form ridges which tightly embrace the union and form a water-tight joint with the outside of the same. The pipe end I, being inserted in the union either before or after the latter has been inserted in the bushing, is held securely in position by tightening up the nut G, which spreads the washer H inwardly, causing it to tightly clasp the pipe and form a water-tight joint.

The connection described is easily put in position and forms an effectual joint, and the interposition of the elastic washer between the pipe union or spud and the boss on the bowl serves to take up any strain or shock and prevents injury to the boss or the bowl.

While the aperture in the boss B has been described as tapering and the bushing E has been described as of similar shape, both may be of even diameter throughout, in which case the bushing should be made of such size as to fit quite tightly in its seat.

Having described my invention, I claim—

1. A bushing for water-closet connections consisting of a cylindrical section of elastic material formed with inwardly projecting flanges, substantially as described.

2. A bushing for water closet connections consisting of a tapered cylindrical section of elastic material having internal annular flanges, substantially as described.

3. A bushing for water closet connections consisting of a cylindrical section of elastic material formed with internal flanges of different widths, substantially as described.

4. The combination with a water closet bowl having a hollow boss or spud end of an elastic bushing adapted to fit in said boss and formed with internal annular flanges, substantially as described.

5. The combination with a water closet bowl having a hollow boss formed integral with the bowl and an elastic bushing fitting within said boss and formed with inwardly projecting annular flanges of a spud or union member fitting in said bushing, a nut screwing on the end of said spud and a washer between said nut and spud, substantially as described.

6. In a pipe connection for water closets, the combination with the bowl having boss B and flange D, with notches $d, d$, of the elastic bushing E having lugs $e, e$, entering the notches $d, d$, and inwardly projecting annular flanges adapted to be folded against the inside of the bushing by an entering pipe or union member, substantially as described.

7. In a connection for water closets, the combination with an elastic bushing having internal, parallel, annular flanges which overlap one another, of a cylindrical union member entering said bushing and compressing said overlapping flanges substantially as described.

8. A bushing for water closet connections consisting of an elastic section having internal annular flanges of such depth that they will overlap one another when pressed against the inner wall of the bushing by an entering union member.

9. In a connection for water closets, the combination with an elastic bushing having internal annular flanges of a pipe or union member entering said bushing and having an external bead engaging with one of said flanges, substantially as described.

10. A bushing for water closet connections consisting of a soft rubber cylinder having one or more inwardly projecting annular flanges or ridges, of less thickness than the length of the cylinder substantially as described.

In testimony whereof I have affixed my signature in presence of two witnesses.

CHARLES R. SCHMIDT.

Witnesses:
GEO. MCCAFFRAY,
JOS. E. QUINN.